APPARATUS PROVIDING ACCESS TO STORAGE DEVICE
ON PRIORITY-ALLOCATED BASIS
Filed May 4, 1964
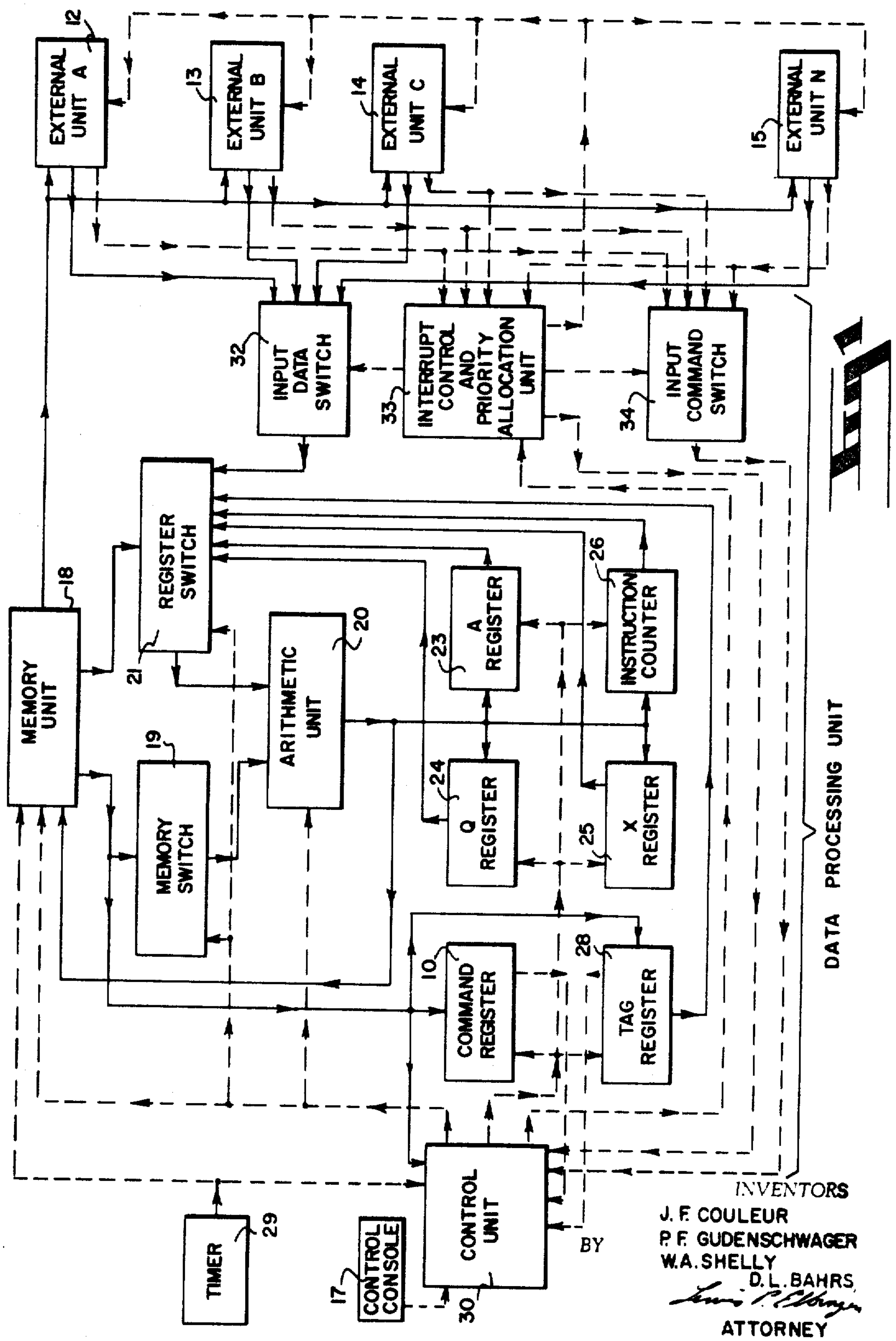
INVENTORS
J. F. COULEUR
P. F. GUDENSCHWAGER
W. A. SHELLY
D. L. BAHRS
BY
ATTORNEY United States Patent Office 3,473,155

Patented Oct. 14, 1969

3,473,155

APPARATUS PROVIDING ACCESS TO STORAGE DEVICE ON PRIORITY-ALLOCATED BASIS

John F. Couleur, Philip F. Gudenschwager, and William A. Shelly, Phoenix, Ariz., and David L. Bahrs, Liverpool, N.Y., assignors to General Electric Company, a corporation of New York Filed May 4, 1964, Ser. No. 364,559
Int. Cl. G06f *1/00, 7/00*
U.S. Cl. 340—172.5 8 Claims

ABSTRACT OF THE DISCLOSURE

Apparatus for providing communication with the memory of a data processing system for a plurality of peripheral units on a priority-allocated basis: wherein there is provided a chain of logical gates, the order of the gates in the chain corresponding to the order of priority of respective ones of the peripheral units; and wherein the requirement for communication with memory by any peripheral unit initiates a signal along the chain to provide a chain output signal representing an interrupt signal; and wherein an output signal provided by any one of the gates in the chain inhibits memory communication for all lower priority peripheral units.

This invention relates to information processing apparatus and more particularly to apparatus for processing at high speeds data received from a plurality of lower speed external devices.

In the processing of data, various arithmetic, logical, or data transfer operations are performed on data items by a data processing unit, the unit being adapted to execute a sequence of these operations in a very short period of time. Each data item comprises a plurality of data digits. These data items are supplied by external units, which include peripheral apparatus, such as magnetic tape and disc storage devices, punched card readers, and electric typewriters and remote apparatus, such as other data processing apparatuses, radar stations, and radio telemetry transmitters. The processed data is received by external units, which include peripheral apparatus such as magnetic tapes and disc storage devices, card punches, and printers and remote apparatus, such as other data processing apparatuses and radio guidance systems. To maintain a rapid rate of execution of these operations, the data processing unit must be able to obtain data items immediately when needed and to store the items immediately after processing. Rapid supply and storage of data items is provided by a high-speed random access memory.

The random access memory operates at a rate of speed compatible with that of the data processing unit, rapidly supplying a data item required by the data processing unit or rapidly storing a data item processed by the data processing unit. These data items are held in respective addressable storage locations in the memory and a data item is retrieved from or stored in a storage location identified by an address. Additionally, the random access memory holds in a group of storage locations thereof instructions for controlling the sequence of operations to be executed by the data processing unit. An instruction normally comprises a command portion of designating the specific type of arithmetic, logical or data transfer operation to be performed and an address portion identifying the storage location in the memory to be involved in the specific operation.

The data processing unit, prior to processing data received from each of a plurailty of lower speed external devices, transfers the data as received into a respective first group of storage locations in the memory. When a predetermined amount of data received from an external device has been stored in the corresponding first storage location group, means is provided to notify the data processing unit, whereupon this data is transferred to a second group of storage locations from which the data is processed. The data results of such processing are then stored in one of a third group of storage locations, a third group being provided for each of the external devices adapted to receive data from the data processing unit.

A high-speed data processing unit of the type described is a complex and costly apparatus. A factor tending to increase the complexity and cost of the data processing unit is that the external devices, although operating at speeds much lower than the data processing unit, also operate at a plurality of mutually different speeds. Additionally, each such external device usually supplies or receives data at a rate asynchronous with respect to the operating rate of the data processing unit. Accordingly, it is common practice for each external device, upon requiring communication with the data processing unit for transferring data to or for receiving data from the memory, to provide a signal, known as an interrupt signal, for notifying the data processing unit of the respective communication requirement. The data processing unit must respond to the interrupt signal by interrupting its normal sequence of data processing operations and granting communication to the external device for effecting the requisite data transfer. However, inasmuch as the external devices operate at different speeds, some cannot wait as long as others before being granted communication with the memory. Therefore, the data processing unit must also provide apparatus for allocating a different priority to each external device, and for recognizing such priorities by granting communication first to the external device allocated highest priority when more than one device requires communication.

Prior art data processing units have heretofore provided apparatus for allocating priorities to each of the external devices and for recognizing these priorities by granting communication to the highest priority external device requiring communication at a given time. Some prior art data processing units have effected these functions with rapidly responding, but relatively costly and complex apparatus, while other prior units have effected these functions with slower responding and less costly, but nevertheless relatively complex apparatus. It is therefore desirable to provide these functions with rapidly responding, but relatively inexpensive and simple and reliable apparatus.

Therefore, it is an object of this invention to provide improved apparatus for providing communication between a data processing unit and slower operating external devices.

Another object of this invention is to provide apparatus for rapidly responding to a plurality of external devices requiring communication with a data processing unit for providing communication for the one of these devices allocated highest priority.

Another object of this invention is to provide rapidly responding, inexpensive, simple, and reliable apparatus for providing communication between a data processing unit and the one of a plurality of external devices requiring communication and allocated highest priority.

The foregoing objects are achieved by providing an information processing system wherein a control element is provided for each external device except that allocated highest priority, and wherein these control elements are coupled together in a chain according to the priority allocated the corresponding external devices. Each control element comprises an AND-gate and an OR-gate. The AND-gate receives the interrupt signal of the corresponding external device as an enabling input signal and the signal delivered by the OR-gate of the next higher priority control element as a disabling input signal. Each OR-gate receives the signal delivered by the corresponding AND-gate as one input signal and the signal delivered by the OR-gate of the next higher-priority control element as another input signal.

Each AND-gate of the invention delivers an output signal if the corresponding external device supplies an interrupt signal, providing no signal is received thereby from the next higher-priority OR-gate.

Each OR-gate of the invention delivers an output signal if the corresponding external device or a higher priority device requires communication with the data processing unit. Hence, the OR-gates form a chain wherein an output signal is delivered by the lowest priority OR-gate in the chain if any external device supplies an interrupt signal.

When a signal is delivered by the lowest priority OR-gate, the data processing unit halts its normal sequence of operations and grants communication to the external device for which the corresponding AND-gate is delivering an output signal. The apparatus thus described is relatively inexpensive, simple, and reliable and rapidly responds to the communication requirements of one or more external devices for granting communication to the highest priority of the devices currently requiring communication.

DESCRIPTION OF DRAWINGS

This invention will be described with reference to the accompanying drawings wherein:

FIGURE 1 is a block diagram of a data processing system embodying the instant invention.

DATA PROCESSING SYSTEM—GENERAL

The Data Processing System of FIG. 1 is adapted to process data under the operational control of a Command Register 10 or one of a plurality of external data handling units, such as External Units 12, 13, 14 and 15. The lines interconnecting the various components illustrated in FIG. 1 symbolically represent paths of data and control communication. Thus, the solid lines represent paths of data communication between the components and the dashed lines represent paths for the transfer of control signals between the components.

The system responds to a plurality of distinct commands to execute a plurality of corresponding operations on data, these commands being supplied in sequential order to Command Register 10, or being supplied by each one of External Units 12–15. The portion of the Data Processing System of FIG. 1 directed to receiving data for processing, processing data, and transmission of processed data is identified herein as the Data Processing Unit. Thus, in FIG. 1, all components, except External Units 12–15, comprise the Data Processing Unit.

The Data Processing Unit comprises a Control Console 17, which provides an indicating and control station for the operator, whereby the operator is provided access to the System for modification of the order of execution of the commands or for revision of data. A Memory Unit 18 stores data items, such as operands which are to be processed, operands which are the result of processing, instructions and other control words for the control of the System by Command Register 10, and channel control words for control of the System by the External Units. The remainder of the System communicates with the Memory Unit to receive therefrom and transmit thereto these operands, instructions, and control words.

All operands received from Memory Unit 18 for processing are transferred through a Memory Switch 19 to an Arithmetic Unit 20. Memory Switch 19 transfers operands directly to Arithmetic Unit 20 or shifts the relative numerical position of the elements of the operands and then transfers the shifted elements to Arithmetic Unit 20. Register Switch 21 provides another source of data items for Arithmetic Unit 20. Register Switch 21 receives portions of data items from Memory Unit 18, data items from storage registers in the Data Processing Unit, and data items from the External Units. Arithmetic Unit 20 performs arithmetic operations, such as addition or subtraction, on the data received from Memory Switch 19 and Register Switch 21 and transmits the data results to Memory Unit 18 or to one of the storage registers.

The Data Processing Unit comprises five storage registers in addition to Command Register 10; namely, A Register 23, Q Register 24, X Register 25, Instruction Counter 26, and Tag Register 28. The A Register, the Q Register, and the X Register provide temporary storage for data from Memory Unit 18. Registers 23, 24, 25, and 26 selecstores an identification of the Memory Unit location of the next instruction to be employed and is periodically incremented so that instructions may be received in sequence from Memory Unit 18. Registers 23, 24, 25, and 26 selectively receive data results from Memory Unit 18. Command Register 10 and Tag Register 28 provide temporary storage for respective portions of instructions received directly from Memory Unit 18. The contents of registers 23, 24, 25, 26 and 28 are selectively supplied to Register Switch 21.

A Timer 29 provides timing signals for timing the sequential execution of the individual steps in the operations performed by the System. A control Unit 30 responds to signals provided by commands in Command Register 10 or to command signals provided by any one of External Units 12–15 for controlling the type of operation being executed by the System. Additionally, Control Unit 30 responds to the timing signals of Timer 29 for controlling the individual steps of each operation.

Data items to be processed by the Data Processing Unit are supplied by External Units 12–15. These External Units also receive and employ the data after it has been processed. The External Units may be, for example, magnetic tape handlers, punched card readers and punches, and electric typewriters. The External Units also may be remote stations in the System for supplying and receiving data. Data supplied by such remote External Units may include missile tracking information provided by a radar station or telemetry information representing, for example, the present conditions of a missile, such as velocity, temperature, and pressure.

Data items supplied by External Units 12–15 are transmitted to an Input Data Switch 32, which selects one of the External Units for transmission of its supplied data item through Register Switch 21, Arithmetic unit 20, and into Memory Unit 18, Memory Unit 18 storing this data item for subsequent processing. An Interrupt Control and Priority Allocation Unit 33 receives control signals provided by the ones of External Units 12–15 currently demanding communication with the Data Processing Unit and controls Input Data Switch 32 to provide communication for the one of the External Units allocated highest priority.

Additionally, External Units 12–15 supply complete information for controlling the Data Processing Unit in its storage and processing of the data items received from the External Units and in its transmission of the processed data to the External Units. Accordingly, the External Units supply the identifications of Memory Unit locations to Input Data Switch 32 and supply command signals to Input Command Switch 34. Interrupt Control 33 also controls Input Command Switch 34 to transmit to Control Unit 30 the command signals provided by the highest priority External Unit currently demanding communication with the Data Processing Unit. Control Unit 30 responds to these command signals for controlling the handling and processing of the data items supplied by the corresponding External Unit.

Thus, the Data Processing System of FIG. 1, which embodies the instant invention, receives, processes, and transmits data under control of either a centrally located Command Register or any one of a plurality of external or remote data handling units.

For a complete description of the system of FIGURE 1 and of the instant invention which is embodied in such system, reference is made to United States Patent 3,298,001, issued to John F. Couleur et al., and assigned to the assignee of the present invention. More particularly, FIGURES 2–26 of the drawings column 1, lines 12–56; column 4, lines 72–75; column 5, lines 1–58; column 7, lines 28–75; and columns 8–81 of United States Patent 3,298,001 are incorporated herein by reference and made a part of the instant patent application.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. For employment with a plurality of communication channels requiring access to a communication link, each of said channels being allocated a different priority for obtaining access to said link, each of said channels delivering a respective demand signal when access to said link is required thereby; apparatus for providing signals to identify the highest priority channel currently requiring access to the link, comprising in combination: a control element for each of a plurality of said channels, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the channel allocated next higher priority, each of said control elements further comprising means responsive to the second output signal delivering by the control element corresponding to the channel allocated next higher priority for disabling the respective one of said first gating means.

2. For employment with a plurality of communication channels requiring access to a communication link, each of said channels being allocated a different priority for obtaining access to said link, each of said channels delivering a respective demand signal when access to said link is required thereby; apparatus for providing signals to identify the highest priority channel currently requiring access to the link, comprising in combination: a control element for each of said channels except the channel allocated highest priority, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the channel allocated next higher priority, each of said control elements further comprising means responsive to the second output signal delivered by the control element corresponding to the channel allocated next higher priority for disabling the respective one of said first gating means, and means responsive to the demand signal of said highest priority channel for delivering a corresponding second output signal.

3. For employment with a plurality of communication channels requiring access to a communication link, each of said channels being allocated a different priority for obtaining access to said link, each of said channels delivering a respective demand signal when access to said link is required thereby; apparatus for providing signals to identify the highest priority channel currently requiring access to the link, comprising in combination: a control element for each of said channels except the channel allocated highest priority, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the channel allocated next higher priority, each of said control elements further comprising means responsive to the second output signal delivered by the control element corresponding to the channel allocated next higher priority for disabling the respective one of said first gating means, means responsive to the demand signal of said highest priority channel for delivering corresponding first and second output signals, and means responsive to the one of said first output signals being delivered for providing access to said link for the corresponding communication channel.

4. For employment with a plurality of data handling units requiring communication with the memory of a data processing unit, each of said data handling units being allocated a different priority for obtaining communication with said memory, each of said data handling units delivering a respective demand signal when communication with said memory is required thereby; apparatus for providing signals to identify the highest priority data handling unit currently requiring communication with the memory, comprising in combination: a control element for each of a plurality of said data handling units, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the data handling unit allocated next higher priority, each of said control elements further comprising means responsive to the second output signal delivered by the control element corresponding to the data handling unit allocated next higher priority for disabling the respective one of said first gating means.

5. For employment with a plurality of data handling units requiring communication with the memory of a data processing unit, each of said data handling units being allocated a different priority for obtaining communication with said memory, each of said data handling units delivering a respective demand signal when communication with said memory is required thereby; apparatus for providing signals to identify the highest priority data handling unit currently requiring communication with the memory, comprising in combination: a control element for each of said data handling units except the data handling unit allocated highest priority, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the data handling unit allocated next higher priority, each of said control elements further comprising means responsive to the second output signal delivered by the control element corresponding to the data handling unit allocated next higher priority for disabling the respective one of said first gating means, and means responsive to the demand signal of said highest priority data handling unit for delivering a corresponding second output signal.

6. For employment with a plurality of data handling units requiring communication with the memory of a data processing unit, each of said data handling units being allocated a different priority for obtaining communication with said memory, each of said data handling units delivering a respective demand signal when communication with said memory is required thereby; apparatus for providing signals to identify the highest priority data handling unit currently requiring communication with the memory, comprising in combination: a control element for each of said data handling units except the data handling unit allocated highest priority, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the data handling unit allocated next higher priority, each of said control elements further comprising means responsive to the second output signal delivered by the control element corresponding to the channel allocated next higher priority for disabling the respective one of said first gating means, means responsive to the demand signal of said highest priority data handling unit for delivering corresponding first and second output signals, and means responsive to the one of said first output signals being delivered for providing communication with said memory for the corresponding data handling unit.

7. For employment with a plurality of data handling units requiring communication with the memory of a data processing unit, each of said data handling units being allocated a different priority for obtaining communication with said memory, each of said data handling units delivering a respective demand signal when communication with said memory is required, wherein said data processing unit comprises command executing means, normally enabled, for controlling said data procesing unit to execute operations in sequence; apparatus for providing signals to identify the highest priority data handling unit currently requiring communication with the memory, comprising in combination: a control element for each of a plurality of said data handling units, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the data handling unit allocated next higher priority, each of said control elements further comprising means responsive to the second output signal delivered by the control element corresponding to the data handling unit allocated next higher priority for disabling the respective one of said first gating means, and means responsive to the second output signal delivered by the control element corresponding to the lowest priority data handling unit for disabling said command executing means.

8. For employment with a plurality of data handling units requiring communication with the memory of a data processing unit, each of said data handling units being allocated a different priority for obtaining communication with said memory, each of said data handling units delivering a respective demand signal when communication with said memory is required thereby, wherein said data processing unit comprises command executing means, normally enabled, for controlling said data processing unit to execute operations in sequence; apparatus for providing signals to identify the highest priority data handling unit currently requiring communication with the memory, comprising in combination: a control element for each of said data handling units except the data handling unit allocated highest priority, each of said control elements comprising first and second gating means, each of said first gating means being normally enabled and responsive to the corresponding demand signal for delivering a respective first output signal, each of said second gating means delivering a second output signal upon receipt thereby of one of (a) the corresponding first output signal and (b) the second output signal delivered by the control element corresponding to the data handling unit allocated next higher priority, each of said control elements further comprising means responsive to the second output signal delivered by the control element coresponding to the data handling unit allocated next higher priority for disabling the respective one of said first gating means, means responsive to the demand signal of said highest priority data handling unit for delivering corresponding first and second output signals, means responsive to the second output signal delivered by the control element corresponding to the lowest priority data handling unit for disabling said command executing means, and means responsive to the one of said first output signals being delivered for providing communicate with said memory for the corresponding data handling unit.

No references cited.

ROBERT C. BAILEY, Primary Examiner

G. D. SHAW, Assistant Examiner

U.S. Cl. X.R.

307—88.5